United States Patent

Nakano

[11] Patent Number: 6,005,606
[45] Date of Patent: Dec. 21, 1999

[54] STILL PICTURE TELEVISION SYSTEM

[76] Inventor: Keizo Nakano, 769-26, Nase-Machi, Totsuka-Ku, Yokohama, Japan

[21] Appl. No.: 08/849,412

[22] PCT Filed: Nov. 24, 1995

[86] PCT No.: PCT/JP95/02396

§ 371 Date: May 23, 1997

§ 102(e) Date: May 23, 1997

[87] PCT Pub. No.: WO96/16513

PCT Pub. Date: May 30, 1996

[30] Foreign Application Priority Data

Nov. 24, 1995 [JP] Japan ................................. 6-289357

[51] Int. Cl.$^6$ ........................................................ H04N 7/00
[52] U.S. Cl. ................................ 348/24; 348/13; 348/22; 455/4.2
[58] Field of Search ...................... 348/22, 24, 12–17, 348/153, 159, 469, 385, 388, 460; 455/4.2

[56] References Cited

U.S. PATENT DOCUMENTS

| 3,988,528 | 10/1976 | Yanagimachi et al. | 348/24 |
| 4,543,854 | 7/1990 | Shiota et al. | 348/159 |
| 5,109,278 | 4/1992 | Erickson et al. | 348/153 |
| 5,157,511 | 10/1992 | Kawai et al. | 386/68 |

FOREIGN PATENT DOCUMENTS

| 53-138631 | 12/1978 | Japan . | |
| 61-26384 | 2/1986 | Japan . | |
| 0034793 | 2/1991 | Japan . | 348/385 |
| 4137967 | 5/1992 | Japan . | |
| 5236474 | 9/1993 | Japan . | |
| 6006290 | 1/1994 | Japan . | 348/24 |
| 670287 | 3/1994 | Japan . | |
| 6165140 | 6/1994 | Japan . | |

*Primary Examiner*—Victor R. Kostak
*Attorney, Agent, or Firm*—Ladas & Parry

[57] ABSTRACT

A system, by which a user can select a necessary frame by simplified arrangement using time-division still picture broadcast system. A natural still picture frame including a reference frame is repeatedly transmitted in a given order using the reference frame as a reference. A user apparatus detects the reference frame, and by counting number of the received frames, relationship of the frame to be displayed is confirmed, and the desired frame is displayed. For the information to select a frame, there are a case where only the information on the displayed still picture is displayed and a case where number of all still pictures transmitted within a period defined by the reference frame is displayed together with the information on the displayed still picture. For the still picture frame information to be inserted in an audio band, there are the following three cases: a case where it is inserted only in an audio band corresponding to the reference still picture, a case where it is inserted in an audio band corresponding to some of the still pictures, and a case where an identification signal is inserted in an audio band corresponding to each of the still pictures. For the still picture frame information to be inserted in the audio band, there are the following three cases: a case where an audio signal is inserted in a main audio band, a case where it is inserted in a second audio band, and a case where other adequate control signal is inserted in a sub audio band

20 Claims, 10 Drawing Sheets

Fig. 6(a)
Fig. 6(b)
Fig. 6(c)
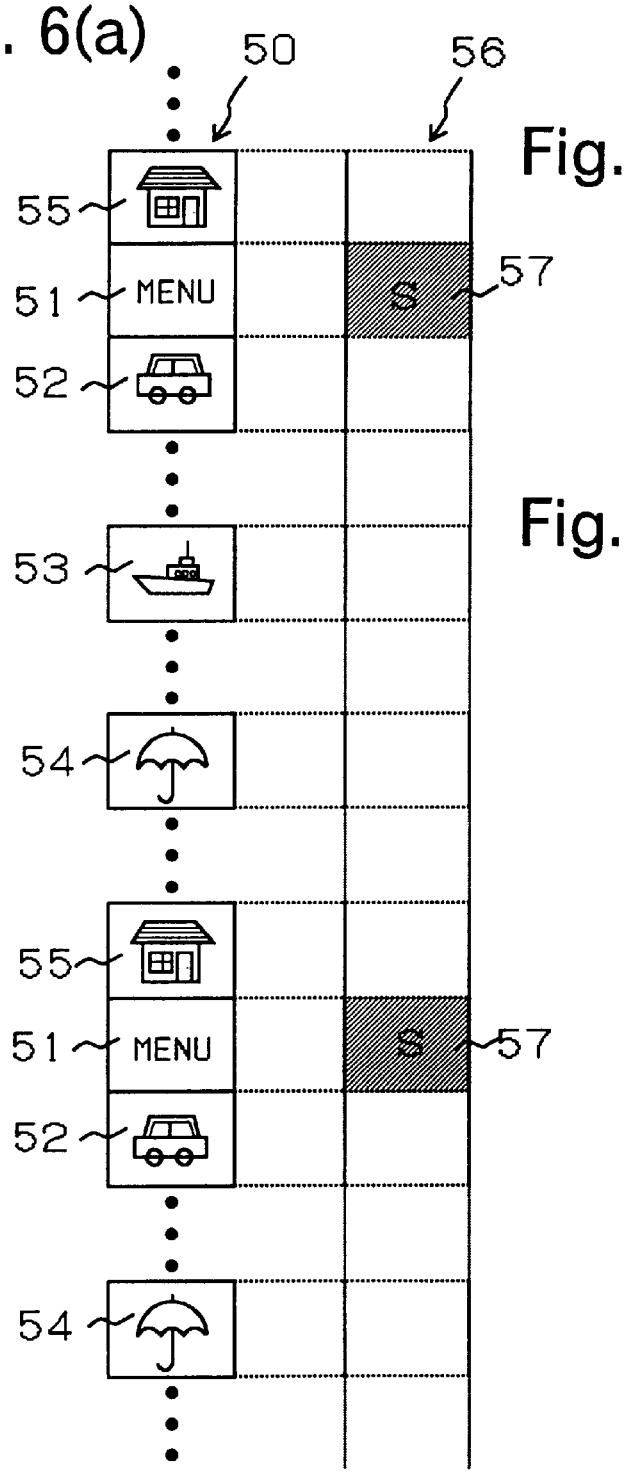
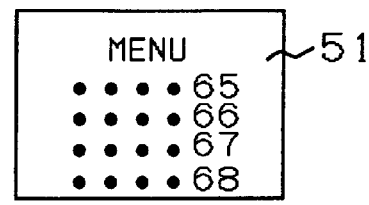
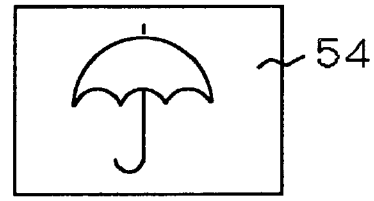

STILL PICTURE TELEVISION SYSTEM

FIELD OF THE INVENTION

The present invention relates to interactive value added information services, which are offered by television broadcasting such as terrestrial wave broadcasting, CATV, or satellite broadcasting, etc. and telephone, and in particular to a system for providing an interactive information service by combining picture media for television such as still picture television broadcasting, still picture video tape, still picture video disk, etc. with a telephone.

BACKGROUND ART

In the information-oriented society of today, various transmitting means are used to transmit electrical and electronic information such as sound, picture, text data, binary data, etc. Of such electrical and electronic information, low quality sound, monochrome still picture at low speed, character data at low speed, and binary data at low speed are transmitted by public telephone line as electric signals, and monochrome still picture at high speed, character data at high speed and binary data at high speed are transmitted by ISDN (Integrated Services Digital Network) line as an electric signal. High quality sound and moving picture are transmitted by terrestrial wave broadcasting, satellite broadcasting or CATV as a modulated radio wave or by optical fiber as modulated light.

In the present information-centered era, attention is now focused on interactive information systems as a promising major information system in future. The interactive information system is a system, in which information is selectively received and positively utilized by the general public, who, hitherto, have been merely receivers of the one-way information sent to them.

Interactive information systems currently used are answering systems using an automatic voice response system via public telephone line, videotex systems represented by CAPTAIN (Character And Pattern Telephone Access Information Network) using still picture, and VRS (Video Response System) using moving picture via dedicated line.

Of these interactive information systems, the answering system is disadvantageous in that sufficient information cannot be obtained because it depends upon audio information only and that input and output data cannot be visually confirmed.

The videotex system has drawbacks in that there is a limitation in the contents to be displayed because texts and pictures are displayed by using character codes, and the picture information using character codes provides a smaller amount of information than a natural picture.

The VRS system has no limitation in the contents of display because a natural moving picture can be used, while communication cost is expensive because a wide band dedicated line must be used.

On the other hand, various information services such as television shopping, application or subscription, weather forecast, traffic information, etc. are offered in the currently used television system, although these are not interactive. Most of the picture information needed in these information services is still picture information, and moving picture information is needed in very rare cases. Thus, in the current television system offering these information services, a still picture is broadcast as moving picture. Specifically, by transmitting several hundreds to several thousands of the same picture, a still picture is displayed on a television set.

Therefore, the transmitting cost of the still pictures is very expensive, and an interactive information service for transmitting still pictures to match the demand of the users is not currently available.

For example, television shopping is one of the information services using pictures. However, in the television shopping practiced to date, only the one-way product information, transmitted by the broadcasting station, is utilized, and interactive information service in which the desired picture from product information is displayed on the television set according to the intention of the users and the users carry out shopping based on the contents of the display is not practically available.

A television picture is composed of frame units. In the NTSC system adopted in Japan, the picture is sent at a rate of 30 frames per second. If one still picture is transmitted for each frame, 30 natural still pictures are transmitted within a second.

As a still picture broadcasting system based on this principle, there is a system called the "time-division still picture broadcast system".

FIG. 1 represents a drawing to explain the time-division still picture communication system.

In the time-division still picture broadcast system shown in FIG. 1, still pictures 3-1, 3-2, 3-3, 3-4 . . . are photographed at first by independent television cameras 4-1, 4-2, 4-3, 4-4 . . . at a still picture broadcasting station 1. Next, these still pictures are composed to television signals comprising frames 5-1, 5-2, 5-3, 5-4 . . . , and these are transmitted to still picture receiving devices 2-1, 2-2, 2-3, 2-4 . . .

Upon receipt of the television signals, necessary frames are stored at frame memories 6-1, 6-2, 6-3, 6-4, . . . at the still picture receiving devices. Next, the stored frames are repeatedly read out from the frame memories and are displayed on display units 7-1, 7-2, 7-3, 7-4 . . . as still pictures.

Selection of the necessary frames and recording them to the frame memories are carried out by the procedure such as inserting a frame identification signal to the horizontal scanning line during the vertical retrace interval of each frame.

In one frame, two field pictures comprising different picture components are superimposed by interlace scanning. Each of the frame pictures is a complete natural picture, while a field picture is not a complete natural picture because its amount of information is only one-half of that of the natural picture. However, when compared with the picture based on character codes, it may be referred as a natural picture, which provides satisfaction. In a broadcast of still pictures, twice as many field pictures are transmitted.

An interactive still picture information service system has been proposed, in which a still picture information service is requested by, for example, a public line and the still picture information service is offered by the "time-division still picture broadcast system" in response to such request. FIG. 2 shows a general outline of the system.

This system comprises a still picture broadcasting station apparatus 8 for broadcasting a still picture by the time-division still picture broadcast system, an information provider apparatus 9, a user apparatus 10, and a data communication device such as a telephone set 15. A terrestrial broadcasting wave 12 or satellite broadcasting wave or CATV radio wave is used to connect between the still picture broadcasting station apparatus 8 and the user apparatus 10, and a communication line 11 such as public line or CATV line is used to connect the telephone set 15 with the information provider apparatus 9. A communication line such as public line or dedicated line is used to connect the information provider apparatus 9 with the still picture broadcasting station apparatus 8.

The information provider apparatus 9 may not be used. In this case, the still picture broadcasting station apparatus 8 is directly connected with the user apparatus 10 via a communication line such as a public line or a dedicated line.

The user apparatus 10 comprises a set-top box 14 for receiving the still picture, a display unit 13 and a data communication device such as a telephone set 15. The set-top box 14 is connected to a television antenna for receiving the still picture broadcast, a television antenna for receiving a satellite broadcast, or a coaxial cable for CATV. The set-top box 14 is connected to the display unit 13 such as a television set. The telephone set 15 is connected to a communication line 11 such as a public line or CATV line.

In this system, when a user wishing to receive the information service, calls the information provider apparatus 9 using the telephone set 15 via the communication line 11 and requests transmission of the desired still picture, the request is transferred to the still picture broadcasting station apparatus 8. As a result, the desired still picture 16 is broadcast, and the desired still picture 17 is displayed on the display unit 13 by the user.

In the interactive still picture information service system as described above, selection of necessary frames and recording of them in frame memories are performed in such a manner that a frame identification signal is inserted into the horizontal scanning line in a vertical retrace interval of each frame by the still picture broadcasting station apparatus 8, and this frame identification signal is detected by the user apparatus 10.

For this purpose, it is necessary to provide means for inserting the frame identification signal to the horizontal scanning line in the vertical retrace interval of each frame at the still picture broadcasting station apparatus 8 and also to provide the user apparatus 10 with means for detecting the frame identification signal. This naturally means that the still picture broadcasting station apparatus 8 and the user apparatus 10 will be more complicated.

DISCLOSURE OF THE INVENTION

To solve the above problems, it is an object of the present invention to provide an interactive information service system, which adopts a "time-division still picture broadcast system" as the information transmitting means and uses a public line as a data communication means, whereby the user can select a necessary frame by a simple arrangement.

The system of the present invention comprises an information service provider apparatus, a user apparatus, a television signal path for connecting the information service provider apparatus with the user apparatus, and a communication path such as a line.

The information service provider apparatus comprises a still picture television signal transmitter for transmitting natural still pictures by the time-division still picture broadcast system and a data communication device for performing data communication with the user.

The user apparatus comprises a still picture television receiver for receiving and displaying a natural still picture television signal transmitted by the time-division still picture broadcast system and a data communication device connected to a communication line via the still picture television receiver for performing data communication with the information service provider.

A terrestrial broadcasting wave, satellite broadcasting wave or CATV line are used for the television signal path, and a public line, ISDN line or CATV line is used as the communication line.

The natural still picture frame including the reference frame is repeatedly transmitted in a given order using the reference frame as a reference. The user apparatus detects the reference frame and counts the number of received frames. As a result, the relationship of the desired frame is confirmed and the desired frame is displayed.

To transmit information for selecting the frames, the following methods are used instead of the prior art method of inserting a frame identification signal to the horizontal scanning line in a vertical retrace interval: insert still picture frame information to the displayed still picture; insert still picture frame information to the audio band; and insert the frame information to one of horizontal scanning line, still picture or audio band.

The number of still pictures to be repeatedly transmitted is fixed in some cases, semi-fixed in some cases, or variable in some other cases.

In one embodiment, information relating to the still picture frame displayed is inserted into the still picture, and in another embodiment, the number of all the still pictures transmitted in a period defined by the reference frame is displayed together with the information on the displayed still picture.

For the still picture frame information to be inserted in the audio band, there are the following three cases: a case where it is inserted into an audio band corresponding to the reference still picture, a case where it is inserted in an audio band corresponding to some still pictures, and a case where it is inserted into audio band corresponding to all still pictures.

For the still picture frame information to be inserted into the audio band, there are the following three cases: an audio signal is inserted into the main audio band; an audio signal is inserted into a sub audio band; and an adequate control signal is inserted into a sub audio band.

The information other than the natural still pictures necessary for the interactive communication is transmitted or received via the communication line, and it is converted to a character pattern by a character generator incorporated in the still picture television receiver of the user. Further, it is stored in frame memory of the user apparatus after being superimposed with the natural still picture, and the superimposed pictures are repeatedly read and displayed on a display unit.

BRIEF DESCRIPTION OF THE DRAWINGS

FIGS. 6(*a*) to 6(*c*) represent a still picture television system of a sixth embodiment of the present invention;

BEST MODE FOR CARRYING OUT THE INVENTION

In the following, description will be given of embodiments of the present invention referring to the accompanied drawings.

To facilitate explanation, the embodiments are divided into the following three cases: a case where frame information is displayed on a still picture, a case where the frame information is inserted into an audio band, and a case where the frame information is inserted into none of the horizontal scanning line, still picture or audio band. Each of these three cases are further divided into a case where the number of still pictures for a period is fixed, a case where it is semi-fixed, and a case where it is variable.

[Embodiment 1]

Figure 1:
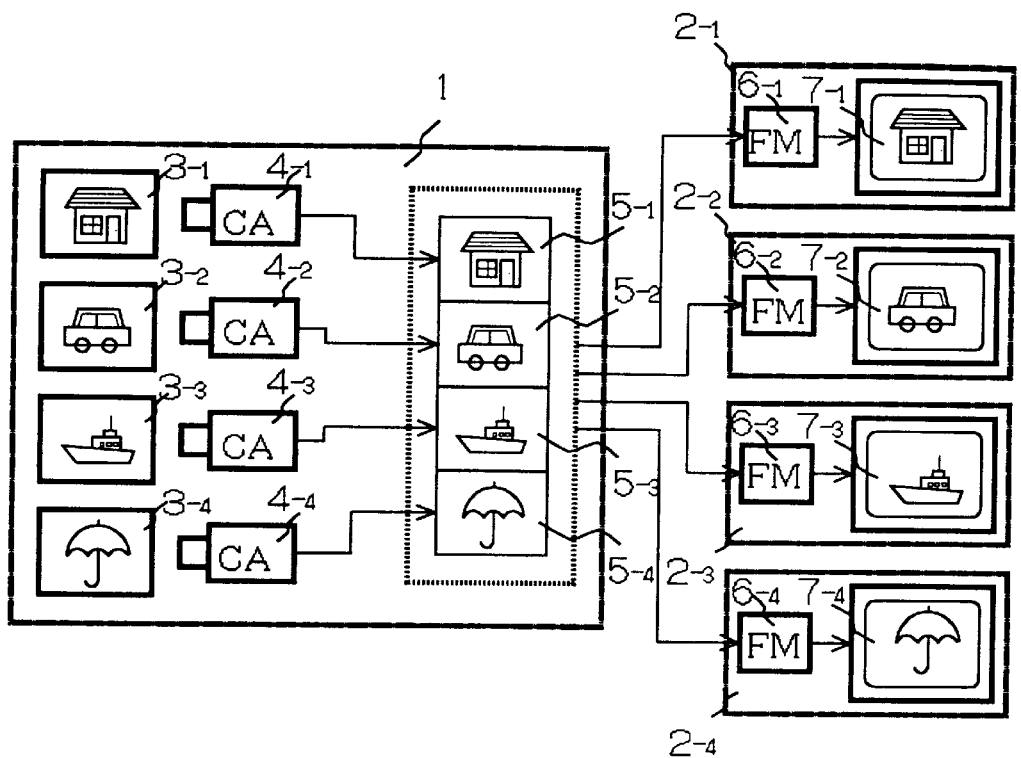
FIG. 1 is a drawing to explain a time-division still picture broadcast system.
Figure 2:
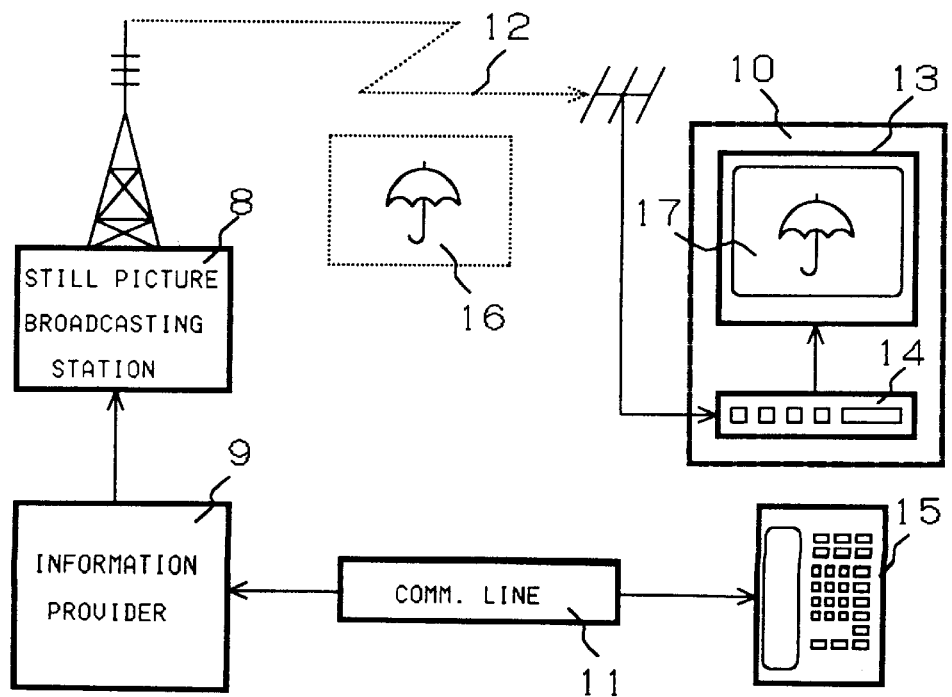
FIG. 2 is a drawing of a still picture broadcast system.

Referring to FIG. 3, description will be given on the operation of an embodiment of a system where frame information is displayed on still pictures and the number of the still pictures to be transmitted is fixed. In this system, a conventional type apparatus as shown in FIG. 2 is used.

Figure 3A:
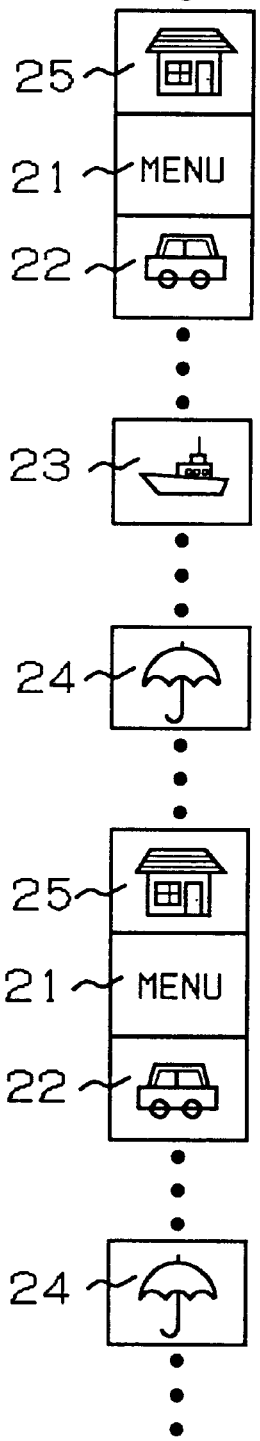
FIGS. 3(*a*) to 3(*d*) represent a still picture television system of first and second embodiments of the present invention.

In this system, as shown in FIG. 3(a), a still picture broadcasting station 8 makes up a set of a fixed number of still pictures, e.g. 100 still pictures such as 21, 22, 23, 24, 25 . . . , puts a frame number to each of the still pictures and transmits them repeatedly. In this case, a still picture 21 having frame number 1 is used as a main menu picture, but this menu picture is not necessarily required.

Figure 3B:
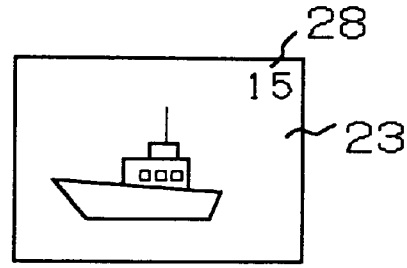

A set-top box 14 for receiving the still picture detects a desired frame, and its still picture 23 is displayed on the display unit 13. In this still picture, a still picture frame number 28 is displayed as "15", for example, as shown in FIG. 3(b).

The set-top box 14 for receiving the still picture starts to count the number of frames after the received still picture. In this case, a still picture having a frame number which is obtained by subtracting an integer multiple of 100 from the number of counts, is the same picture as the displayed still picture. Accordingly, the counter of the set-top box 14 for receiver of still picture is reset at every 100 counts.

Also, a frame having a frame number 1 and being next to a frame having a frame number 100 is a frame of a main menu picture. Therefore, a frame next to a frame having a number, which is obtained by subtracting the displayed frame number 15 from the total frame number 100, i.e. a frame after 86 counts, is a frame of the main menu picture 21.

Figure 3C:
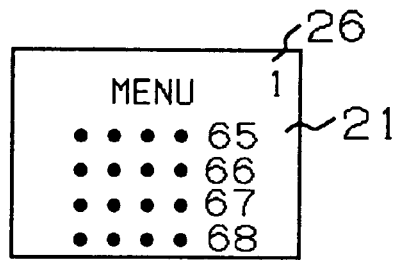

When the user inputs "15" to the set-top box 14 for receiving the still picture, a menu picture 21 having the frame number 26 which is displayed as "1", meaning that it is a menu picture, is displayed on the display unit 13 as shown in FIG. 3(c). This is the frame after 86 counts, which is obtained by subtracting the displayed frame number 15 from the total frame number 100 and by adding 1.

Also, the menu picture may comprise a main menu picture and a sub-menu picture.

Figure 3D:
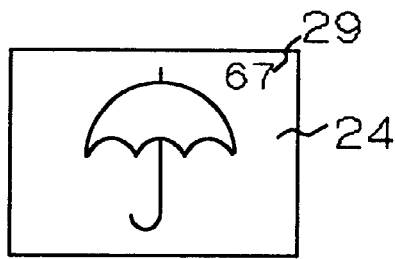

When a frame number "67" of a desired still picture 24, as shown in FIG. 3(d), is inputted to the receiver 14 based on the data of the menu picture 21, the set-top box 14 for receiving the still picture searches to display a still picture 24, which is specified according to a frame number counted by the same procedure as in the case where the main menu is displayed.

Some of the still picture information to be offered such as weather information, stock market information, traffic information, etc. may be better broadcast regardless of whether the user wants it or not.

The system is designed in such a manner that the still picture information as described above can be selected from the main menu picture or from the upper-level sub-menu picture.

[Embodiment 2]

Description will now be given on the operation of an embodiment where the frame information is displayed on still pictures and the number of the still pictures to be transmitted is semi-fixed. The arrangement of the still pictures in this embodiment is the same as in Embodiment 1, and description will be given referring to FIG. 3.

In this system, as shown in FIG. 3(a), the still picture broadcasting station 8 makes up a set of a fixed number of still pictures, e.g. 90 still pictures such as 21, 22, 23, 24, 25 . . . , puts a frame number to each of the still pictures, and transmits them repeatedly. In this case, a still picture 21 having frame number 1 is regarded as a menu picture, but this menu picture is not necessarily required.

The number of the still pictures to be transmitted is a semi-fixed number, which varies according to the conditions of broadcasting. This number, e.g. 90, is notified in advance by other publicity information transmitting means such as newspaper or by individual information transmitting means such as a telephone line.

The user inputs in advance the data on the number of still pictures obtained from these information transmitting means to the set-top box 14 for receiving the still picture.

As shown in FIG. 3(b), the set-top box 14 detects an adequate frame, and its still picture 23 is displayed on the display unit 13. On this still picture, a still picture frame number 28 is displayed as "15", for example.

The set-top box 14 for receiving the still picture starts to count the number of frames after the received still picture. In this case, the still picture having a frame number, which is obtained by subtracting an integer multiple of 90 from the number of counts, is the same picture as the displayed still picture. Accordingly, the counter of the receiver 14 is reset at every 90 counts.

Also, a frame having a frame number 1 and being next to a frame having a frame number 90 is the frame of the main menu picture. Therefore, a frame next to the number, which is obtained by subtracting the displayed frame number 15 from the total frame number 90, i.e. a frame after 76 counts, is the frame of the main menu picture 21.

When the user inputs "15" to the set-top box 14 for receiving the still picture, a main menu picture 21 having a frame number 26 displayed as "1" is displayed on the display unit 15 as shown in FIG. 3(c), meaning that it is a menu picture. This is a frame after 76 counts, which is obtained by subtracting the display frame number 15 from the total frame number 90 and by adding 1.

Also, the menu picture may comprise a main menu picture and a sub-menu picture.

When a frame number "67" of a desired still picture 24, as shown in FIG. 3(d), is inputted to the set-top box 14 for receiving the still picture based on the data of the menu picture 21, the set-top box 14 for receiving the still picture searches and displays the specified still picture 24 according to the frame number counted by the same procedure as in the case where the main menu is displayed.

Some of the still picture information to be offered such as weather information, stock market information, traffic information, etc. may be better broadcast regardless of whether the user wants it or not.

The system is designed in such a manner that the still picture information as described above can be selected from the main menu picture or from the upper-level sub-menu picture.

[Embodiment 3]

Description will be given below on operation of a system of an embodiment where frame information is displayed on still pictures and the number of still pictures to be transmitted is variable, referring to FIG. 4.

In this system, the conventional apparatus as shown in FIG. 2 is also used.

Figure 4A:
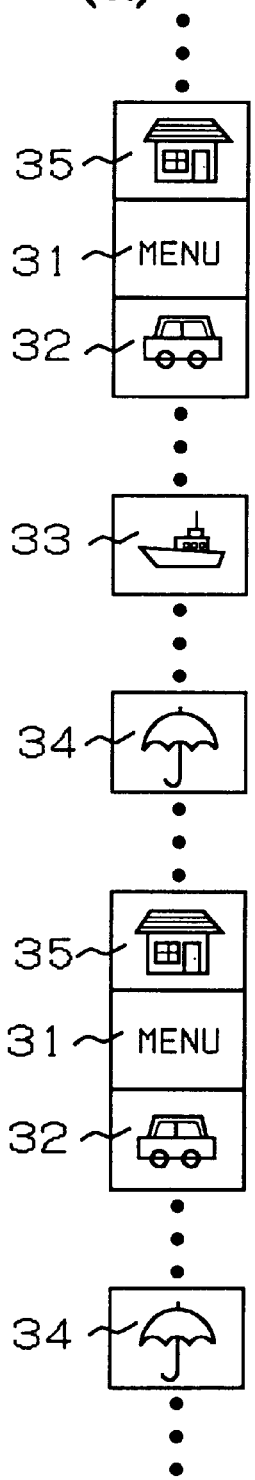
FIGS. 4(*a*) to 4(*d*) represent a still picture television system of a third embodiment of the present invention.

As shown in FIG. 4(a), the still picture broadcasting station makes up a set of an adequate number of still pictures, e.g. 100 still pictures such as 31, 32, 33, 34, 35, ... puts a frame number to each of the still pictures, and transmits them repeatedly. In this case, the frame number also contains information on the total number of still pictures.

In this case, the first still picture is regarded as a menu picture, but this menu picture is not necessarily required.

The set-top box 14 for receiving the still picture detects an adequate frame and displays its still picture 33 and starts to count the number of frames after the displayed still picture.

Figure 4B:
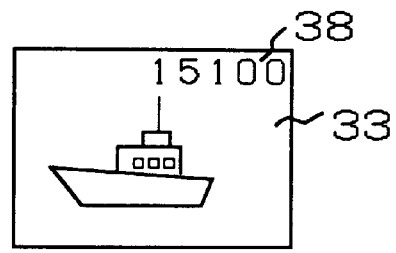

As shown in FIG. 4(b), the frame number of the still picture and the total number of all the transmitted still pictures, e.g. 15 and 100, are displayed on the received still picture as "15100", as shown by reference numeral 38 in the Figure.

Alternatively, the display may be, for example, "10015", "115/100", "15-100", etc.

The user inputs "15100" to a controller of the receiver 14.

Where 100 still pictures are repeatedly transmitted, the still picture having a frame number, which is obtained by subtracting an integer multiple of 100 from the number of counts, is the same picture as the displayed still picture. Therefore, if the user inputs "15100", information that the total number of still pictures is 100 is inputted to the user apparatus because the latter half of the inputted number inputted to the user apparatus is "100".

When the total number of still pictures is inputted, the user apparatus subtracts an integer multiple of 100 from the number of counts, and the counter is reset at every 100 counts.

A frame having a frame number 1 and being next to a frame having a frame number 100 is the frame of the main menu picture. Accordingly, a frame next to the number, which is obtained by subtracting the displayed frame number 15 from the total frame number 100, i.e. a frame after 86 counts, is the frame of the menu picture 31.

Figure 4C:
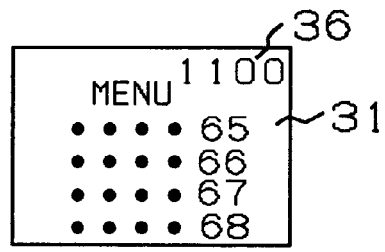

When the user inputs "15100" to the set-top box 14 for receiving the still picture, a menu picture 31 having a frame number 36 which is is displayed as "1100", meaning that it is the menu picture, is displayed on the display unit 15 as shown in FIG. 4(c). This is the frame after 86 counts, which is obtained by subtracting the display frame number 15 from the total frame number 100 and by adding 1.

Also, the menu picture may comprise a main menu picture and a sub-menu picture.

Figure 4D:
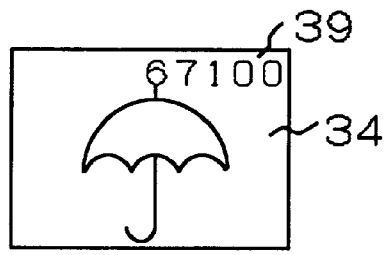

When the frame number "67100" of the desired still picture as shown in FIG. 4(d) is inputted to the receiver 14 based on the data of the menu picture 31, the receiver 14 searches to display the specified still picture 34 according to the frame number counted by the same procedure as in the case where the main menu is displayed.

Some of the still picture information to be offered such as weather information, stock market information, traffic information, etc. may be better broadcast regardless of whether the user wants it or not.

It is designed in such a manner that the still picture information, as described above, can be selected from the main menu picture or from the upper-level sub-menu picture.

[Embodiment 4]

FIG. 5 shows a method to detect a specific picture such as a menu picture by arranging not a character signal but a section of the picture having a specific hue or luminance.

The conventional apparatus as shown in FIG. 2 may be modified and used.

Figure 5A:
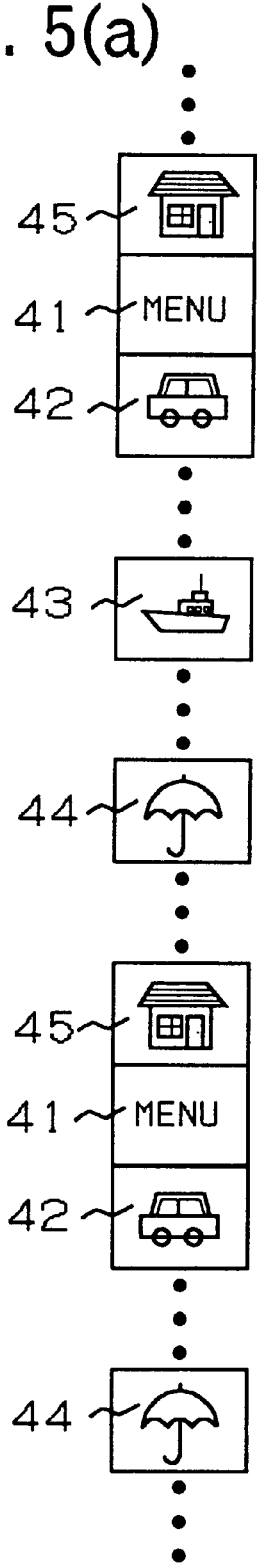
FIGS. 5(*a*) to 5(*e*) represent a still picture television system of fourth and fifth embodiments of the present invention.

As shown in FIG. 5(a), the still picture broadcasting station 8 makes up a set of an adequate number of still pictures, e.g. 100 still pictures such as 41, 42, 43, 44, 45, ..., then, as shown by 46 in FIG. 5(b), a section having a specific hue or luminance is arranged on a part of a specific still picture frame 41 (hereinafter referred as "reference frame"), and these are repeatedly transmitted.

In this case, the still picture of the reference frame 41 is regarded as a menu picture, but this menu picture is not necessarily required.

Figure 5B:
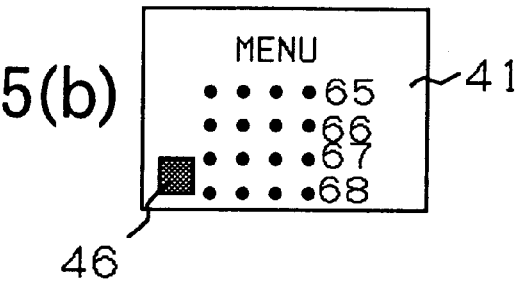

The set-top box 14 detects the reference frame 41 based on the reference frame signal 46, displays a menu picture as the reference frame 41 on the display unit 13, as shown in FIG. 5(b), and starts to count the number of the subsequent frames.

Also, the menu picture may comprise a main menu picture and a sub-menu picture.

The counter of the frame number is reset each time the reference frame number 46 is received.

Figure 5C:
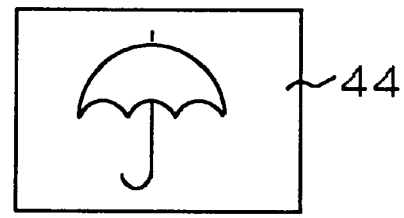

When the user inputs the frame number of the desired still picture to the receiver 14 based on the data of the menu displayed as the reference frame 41 on the display unit 13, the receiver searches the specified picture according to the number of frames counted, and the desired still picture 44 is displayed on the display unit 13 as shown in FIG. 5(c).

Based on the reference frame signal 46, the frame counter is started, and the number of counts until the next reference frame signal is received is the total frame number.

Therefore, even when the number of frames is variable, it is possible in this case to identify the total frame number.

Some of the still picture information to be offered such as weather information, stock market information, traffic information, etc. may be better broadcast regardless of whether the user wants it or not.

If the relationship of the still picture information with the reference frame is kept at constant level, the still picture can be selected without using the main menu.

[Embodiment 5]

Figure 5D:
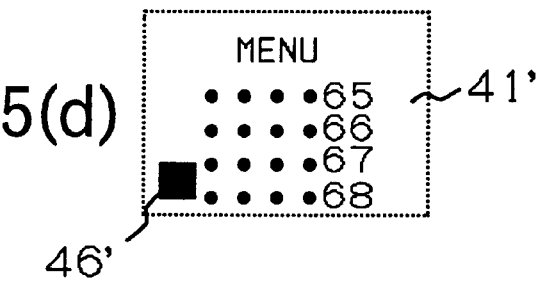
Figure 5E:
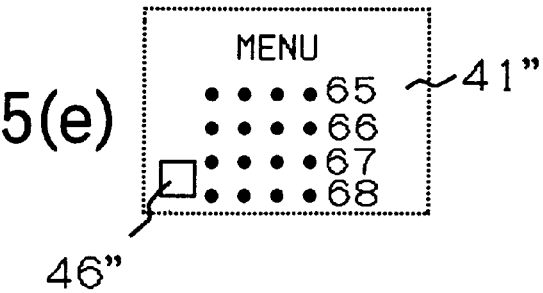

FIGS. 5(d) and (e) represent variations of Embodiment 4, and reference numerals 41' and 41" represent a first field and a second field respectively, which constitute a frame 41.

The frame number in this case is different between the first field and the second field. This contributes to easier identification.

[Embodiment 6]

Referring to FIG. 6, description will be given on the operation of an embodiment where the still picture frame information is inserted into an audio band and it is inserted into the audio band corresponding only to a specific still picture. In this system, the conventional type apparatus, as shown in FIG. 2, can be modified and used.

In FIG. 6(a), reference numeral 50 represents a still picture program, and 56 represents an audio band to be broadcast together with the still picture program.

The still picture broadcasting station 8 makes up a set of an adequate number of still pictures, e.g. 100 still pictures such as 51, 52, 53, 54, 55 . . . A signal 57 (hereinafter referred to as "reference frame signal") is inserted at a point to correspond to a specific still picture frame 51 (hereinafter referred to as "reference frame") in the audio band 56, e.g. at the position of a vertical synchronizing signal to be repeatedly transmitted.

In this case, the still picture of the reference frame 51 is regarded as a menu picture, but this is not necessarily required.

The reference frame signal 57 may be sound inserted in a main audio band, or it may be inserted in a sub audio band, or it may be a control signal other than sound inserted in the sub audio band.

The set-top box 14 for receiving the still picture detects the reference frame 51 based on the reference frame signal 57 inserted in the audio band, displays the menu picture of the reference frame 51 on the display unit 13, as shown in FIG. 6(b), and starts to count the number of the subsequent frames.

Also, the menu picture may comprise a main menu picture and a sub-menu picture.

The counter of the number of frames is reset each time the reference frame signal 57 is received.

When the user inputs the frame number of the desired still picture to the receiver 14 based on the data of the display menu displayed as the reference frame 51 on the display unit 13, the receiver searches for the specified picture according to the number of the counted frames and displays it on the display unit 13, as shown in FIG. 6(c).

By the reference frame signal 57, the frame counter is started, and the number of counts until the next reference frame signal is received is the total number of frames.

Therefore, the total number of frames can be identified even when the number of frames is variable.

Some of the still picture information to be offered such as weather information, stock market information, traffic information, etc. may be better broadcast regardless of whether the user wants it or not.

If the relationship of the still picture information with the reference frame is kept at a constant level, it is possible to select the still picture without using the main menu.

When the reference frame signal 57 is inserted into the main audio band, the reference frame signal 57 is heard by the user as sound.

To avoid this, the reference frame signal 57 should be inserted into the sub audio band.

In such a case, a control signal other than sound may be used as the signal to be inserted into the sub audio band.

In a television set, the picture signal and the audio signal are processed separately, and even when it is tried to use the signal inserted in the audio band as a control signal to select the still picture, it may not be successfully controlled.

In such a case, the signal inserted in the audio band should be transmitted at an earlier time than the corresponding still picture frame.

[Embodiment 7]

Description will now be given on operation of an embodiment where still picture frame information is inserted only in the audio band, which corresponds to some of the still pictures.

Figure 7A:
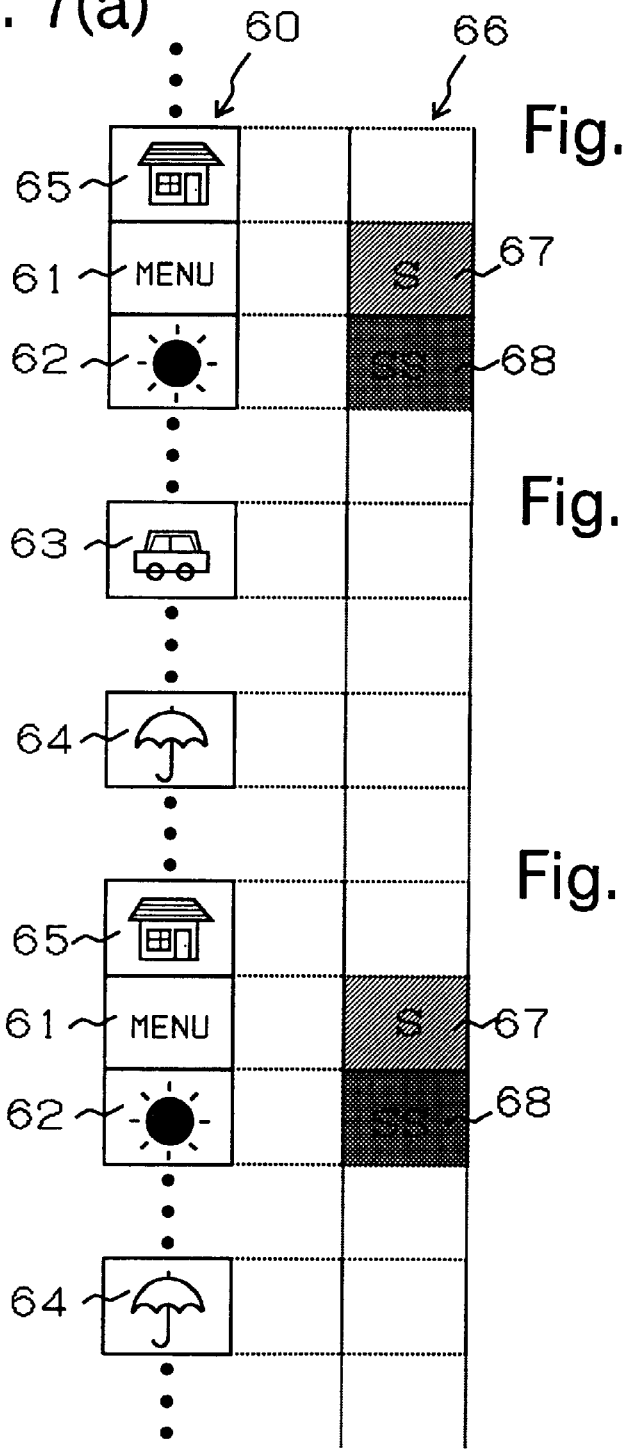
FIGS. 7(a) to 7(c) represent a still picture television system of a seventh embodiment of the present invention.

In FIG. 7(a), reference numeral 60 represents a still picture program, and 66 represents an audio band, which is broadcast together with the still picture program.

The still picture broadcasting station 8 makes up a set of an adequate number of still pictures, e.g. 100 still pictures such as 61, 62, 63, 64, 65 . . . A signal 67 (hereinafter referred to as "reference frame signal") is inserted at a point corresponding to a specific still picture frame 61 (hereinafter referred to as "reference frame") in the audio band 66, e.g. at the position of the vertical synchronizing signal, and a signal 68 (hereinafter referred to as "sub-reference frame signal") is inserted at a point corresponding to some of the still picture frames 62 . . . (hereinafter referred to as "sub-reference frame"), e.g. at the position of the vertical synchronizing signal, and these are transmitted repeatedly.

In this case, the still picture of the reference frame 61 and the still picture of the sub-reference frame 62 are regarded as a menu picture and a sub-menu picture, but other pictures may also be displayed.

When the reference frame signal 67 and the sub-reference frame signal 68 are inserted in the audio band, there are the following three cases: a case where these are sound signals inserted in the main audio band, a case where they are sound signals inserted in the sub audio band, and a case where they are control signals other than sound inserted in the sub audio band.

The reference frame signal and the sub-reference frame signal are signals identifiable, i.e. distinguishable, from each other.

Figure 7B:
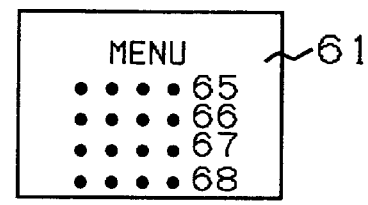

The set-top box 14 for receiving the still picture detects a reference frame 61 based on the reference frame signal 67 inserted in the audio band and a sub-reference frame 62 based on the sub-reference frame signal 68, and displays a main menu picture 61, i.e. a reference frame picture, and a sub-menu picture 62, i.e. a sub-reference frame picture, on the display unit 13, as shown in FIG. 7(b), and starts to count the number of the subsequent frames.

The count of the number of frames is reset each time the reference frame signal 67 is received.

Figure 7C:
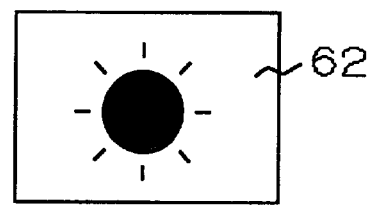
Figure 7D:
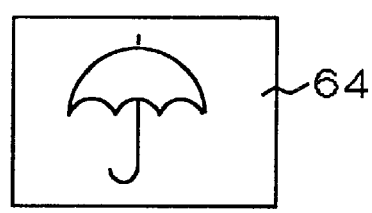

When the user inputs to the receiver 14 the frame number of the desired still picture, based on the data of the main menu picture 61 or on the data of the sub-menu picture 62 displayed on the display unit 13, the receiver searches the specified picture according to the number of the counted frames and displays it on the display unit 13 as shown in FIG. 7(c).

By the reference frame signal 67, the frame counter is started, and the number of counts until the next reference frame signal is received is the total number of frames.

Therefore, it is possible in this case to identify the total number of frames even when the number of frames is variable.

If the relationship on the still picture information with the reference frame is kept at a constant level or if the still picture displayed on the sub-reference frame is the sub-menu picture, it is possible to select the still picture without using the menu.

If the still picture program is arranged in a plurality of groups and a reference frame is provided for each of these groups, and if a reference frame signal having a different form is used for each of a plurality of reference frames, a single still picture broadcasting station can transmit a plurality of still picture programs at the same time.

When the reference frame signal 67 or the sub-reference frame signal 68 is inserted into the main audio band, the reference frame signal 67 or the sub-reference frame signal 68 is heard by the user as sound.

To avoid this, the reference frame signal 67 or the sub-reference frame signal 68 should be inserted into the second audio band.

In such a case, an adequate control signal other than sound may be used as a signal inserted in the sub audio band.

In a television set, the picture signal and the audio signal are separately processed. Accordingly, even when it is tried to use the signal inserted into the audio band as the control signal for selecting the still picture, it may not be successfully controlled.

In such a case, the signal inserted in the audio band should be transmitted at an earlier time than the corresponding still picture frame.

If it is designed in such a manner that the sub-reference frame signal is regarded as a specific signal and a still picture having this signal cannot be used in the general user apparatus, it is possible to transmit the sub-reference frame still picture only to a specific user or a specific group of users, and secrecy can be kept for instances such as television shopping.

[Embodiment 8]

Description will be given now on operation of a system of an embodiment where still picture frame information is inserted in an audio band to correspond to all still pictures.

Figure 8:
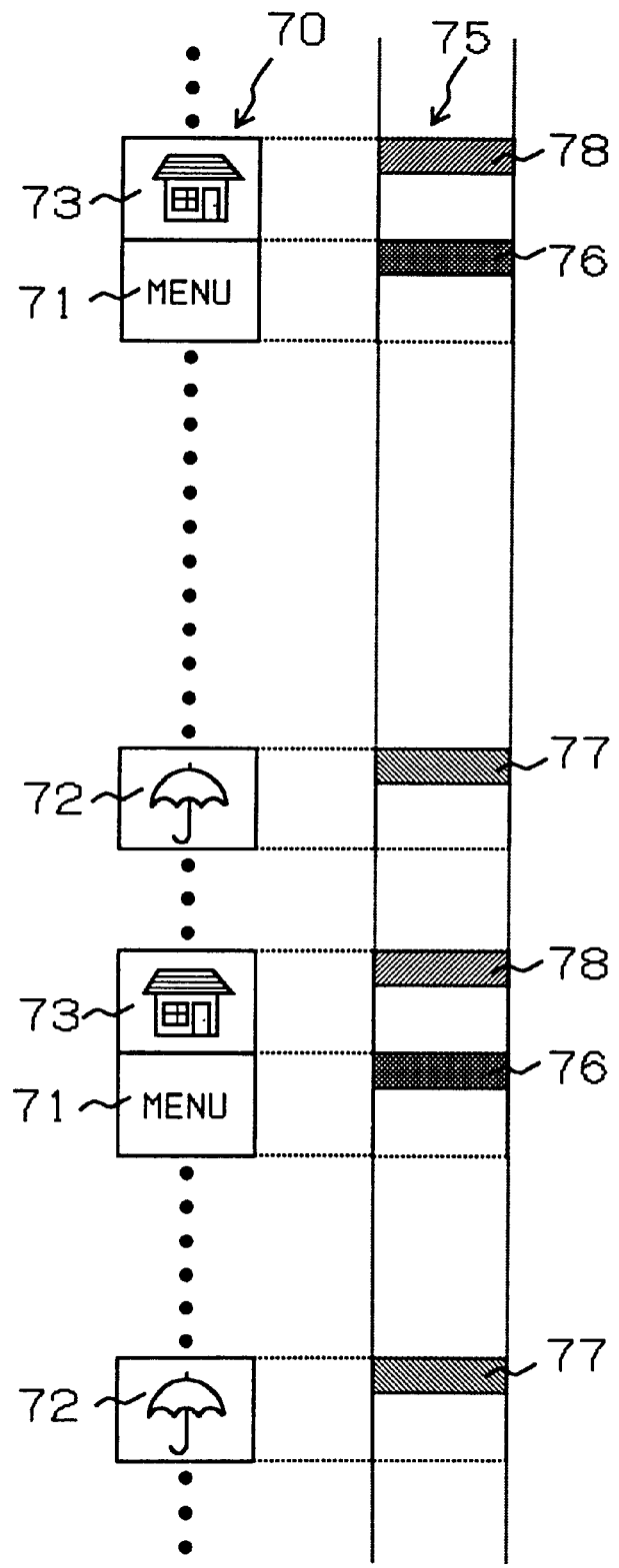
FIG. 8 represents a still picture television system of an eighth embodiment of the present invention.

FIG. 8 shows an embodiment where still picture frame information is inserted in the main audio band corresponding to all still pictures. Reference numeral 70 represents a still picture program, and 75 indicates a main audio band to be broadcast together with the still picture program.

The still picture broadcasting station 8 makes up a set of an adequate number of still pictures, e.g. 100 still pictures such as 71, 72, 73 . . . Signals 76, 77, 78 . . . are inserted at points in the main audio band 75 corresponding to each of the still picture frames, e.g. at the position of the vertical synchronizing signal, and are repeatedly transmitted.

In this case, the reference frame signal 76 to be inserted at a point corresponding to a specific reference frame 71 may be made different from the signal to be inserted at points corresponding to the other frames.

The set-top box 14 for receiving the still picture detects a reference frame 71 based on the reference frame signal 76 inserted in the audio band, displays a main menu picture 71, i.e. its reference frame picture, on the display unit 13, and starts to count the number of the subsequent frames.

The count of the number of frames is reset each time the reference frame signal 76 is received.

When the user inputs to the receiver 14 the frame number of the desired still picture, based on the data of the main menu picture 71 displayed on the display unit 13, the receiver searches the specified picture according to the number of the counted frames, and displays it on the display unit 13.

By the reference frame signal 76, the frame counter is started, and the number of counts until the next reference frame signal is received is the total number of frames.

Therefore, it is possible in this case to identify the total number of frames even when the number of frames is variable.

If the relationship on the still picture information with the reference frame is kept at constant level or if the still picture displayed on the sub-reference frame is the sub-menu picture, it is possible to select the still picture without using the menu.

If the still picture program is arranged in a plurality of groups, and a reference frame is provided to each of these groups and a reference frame signal having a different form is used for each of a plurality of reference frames, a single still picture broadcasting station can transmit a plurality of still picture programs at the same time.

[Embodiment 9]

Figure 9:
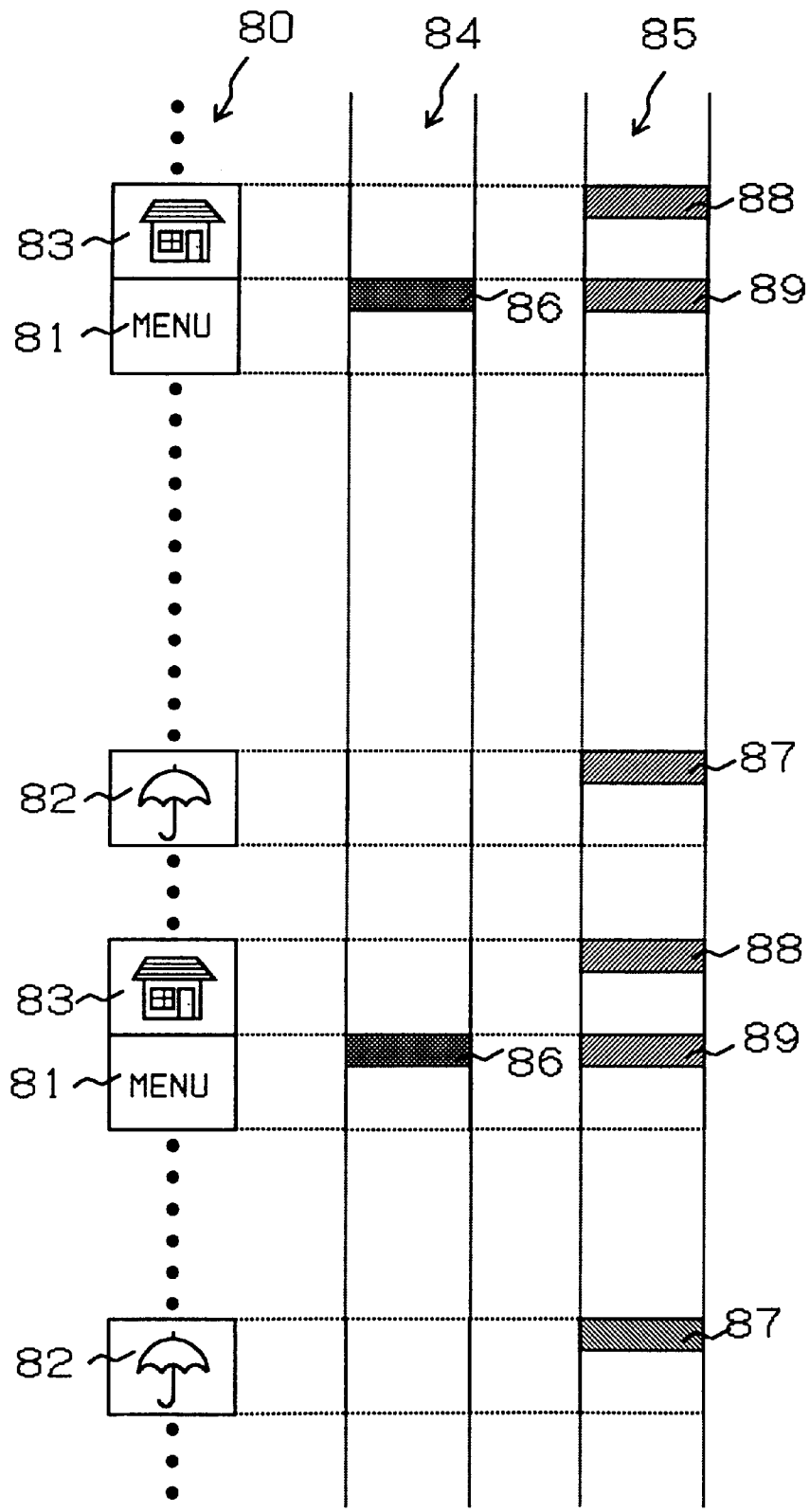
FIG. 9 represents a still picture television system of a ninth embodiment of the present invention.

FIG. 9 shows an embodiment where a signal corresponding to a still picture frame is inserted into the main audio band and the sub audio band. Reference numeral 80 represents a still picture program, and 84 represents the main audio band and 85 the sub audio band which are broadcast together with the still picture program.

The still picture broadcasting station 8 makes up a set of an adequate number of still pictures, e.g. 100 still pictures such as 81, 82, 83 . . . A reference frame signal 86 is inserted at a point in the main audio band 84 corresponding to the reference frame 81, e.g. at the position of vertical synchronizing signal, and signals 87, 88, 89, . . . are inserted at each of the points in the sub audio band corresponding to each of the still pictures, e.g. at the position of vertical synchronizing signal, and these are repeatedly transmitted.

The set-top box 14 for receiving the still picture detects the reference frame 81 based on the reference frame signal 86 inserted in the main audio band, displays a main menu picture, i.e. the reference frame picture, on the display unit 13, and starts to count the number of the subsequent frames.

The count of the number of frames is reset each time the reference frame signal 86 is received.

When the user inputs to the receiver 14 the frame number of the desired still picture, based on the data of the main menu picture displayed on the display unit 13, the receiver searches the specified picture according to the number of the counted frames, and displays it on the display unit 13.

By the reference frame signal 86, the frame counter is started, and the number of counts until the next reference frame signal is received is the total number of frames.

Therefore, it is possible in this case to identify the total number of frames even when the number of frames is variable.

If the relationship on the still picture information with the reference frame is kept at constant level or if the still picture displayed on the sub-reference frame is the sub-menu picture, it is possible to select the still picture without using the menu.

[Embodiment 10]

Description will now be given on a system of an embodiment where frame information is not inserted in any of the horizontal scanning line, the still picture or the audio band.

In this embodiment, still picture frame information is not inserted in the still pictures transmitted from the still picture broadcasting station. It is transmitted via public line, or where still pictures are broadcast via CATV, it is transmitted via CATV line.

Therefore, an audio signal or an adequate control signal other than the audio signal is used as in the case of still picture frame information inserted in the sub audio band.

Figure 10:
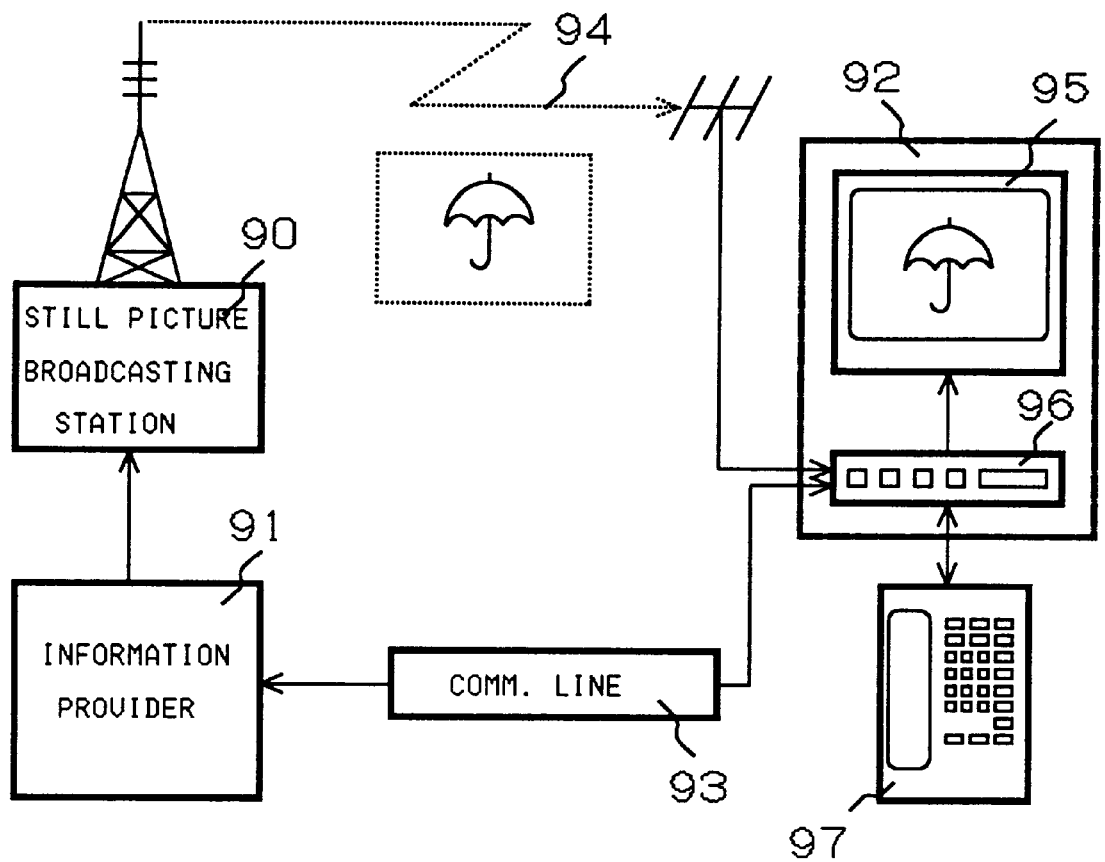
FIG. 10 shows a still picture television system used in a tenth embodiment of the present invention.

FIG. 10 shows an arrangement of a system according to the present invention. This system comprises a still picture broadcasting station apparatus 90 for broadcasting a still picture by time-division still picture broadcast system, an information service provider apparatus 91, a user apparatus 92 and a data communication device such as a telephone 97. The still picture broadcasting station apparatus 90 communicates with the user apparatus 92 via terrestrial broadcasting path, satellite broadcasting path or CATV path 94. The telephone 97 is connected with the information service provider apparatus 91 via a communication line 93 such as a public line or CATV line. The information service provider apparatus 91 is connected with the still picture broadcasting station apparatus 90 via a communication line such as a public line or a dedicated line.

The information service provider apparatus 91 may not be used. In this case, the still picture broadcasting station apparatus 90 is directly connected with the user apparatus 92 via the communication line 93 such as public line or dedicated line.

The user apparatus 92 comprises a set-top box 96 for receiving the still picture and a display unit 95. A television antenna for receiving satellite broadcasting or a coaxial cable for CATV is connected to the set-top box 96. The set-top box 96 for receiving the still picture is connected to a display unit 95 such as a television set. The communication line 93 is connected with the telephone 97 indirectly via the set-top box 96 for receiving the still picture.

In this embodiment, the reference frame signal is not inserted in the synchronizing signal of the still picture or in the audio band, but it is transmitted, for example, as a dual-tone signal, via the communication line. To utilize the dual-tone signal transmitted via the communication line, it is necessary to capture the signal in the set-top box 96. For this purpose, the communication line 93 is directly connected to the set-top box 96 and the telephone 97 is indirectly connected with the communication line 93 via the set-top box 96.

Next, description will be given on the operation of the system of the FIG. 10 embodiment, referring to FIG. 11.

Figure 11A:
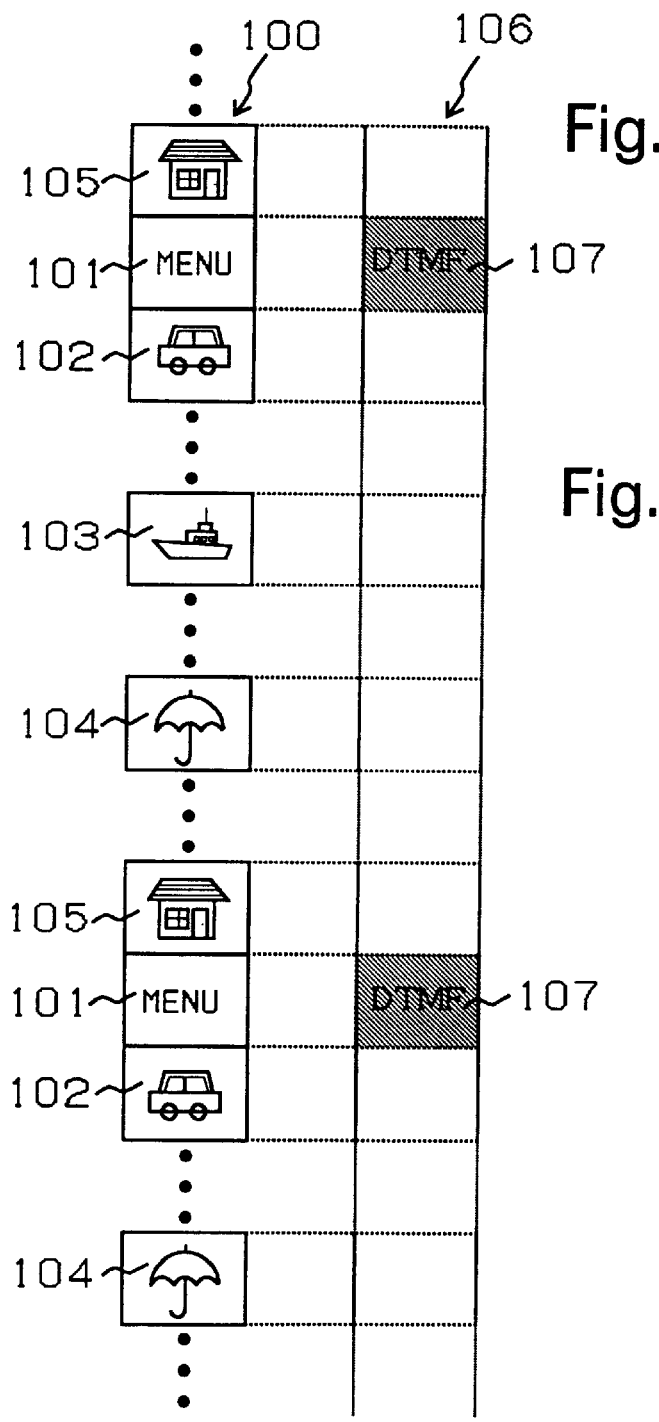
FIGS. 11(a) to 11(c) represent a still picture television system of the tenth embodiment of the present invention.

In FIG. 11(a), reference numeral 100 represents a still picture program, and 106 indicates an audio signal transmitted via the communication line.

The still picture broadcasting station 90 makes up a set of an adequate number of still pictures, e.g. 100 still pictures such as 101, 102, 103, 104, 105 . . . , and transmits them repeatedly.

On the other hand, the information service provider apparatus 91 synchronizes the reference frame dual tone multi frequency (DTMF) signal 107 with the reference frame and transmits it to the set-top box 96 for receiving the still picture via the communication line.

In this case, the still picture of the reference frame 101 is regarded as a menu picture, but this menu picture is not necessarily required.

Figure 11B:
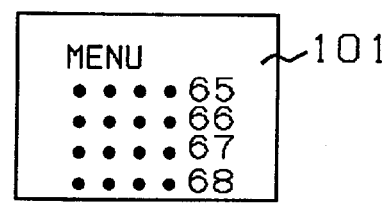

The set-top box 96 detects the reference frame 101 based on the received reference frame DTMF signal 107, displays the menu picture, i.e. the reference frame 101, on the display unit 95, as shown in FIG. 11(b), and starts to count the number of the subsequent frames.

The menu picture may comprise a main menu picture and a sub-menu picture.

The count of the number of frames is reset each time the reference frame DTMF signal 107 is received.

Figure 11C:
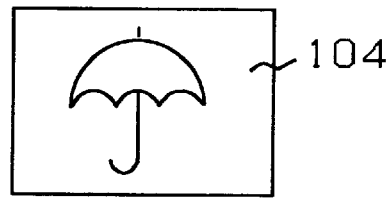

When the user inputs the frame number of the desired still picture to the set-top box 96 for receiving the still picture by DTMF signal of the telephone based on the data of the menu displayed as the reference frame 101 on the display unit 95, and the set-top box 96 searches for the specified picture according to the number of the counted frames, and displays the specified still picture 104 on the display unit 95, as shown in FIG. 11(c).

By the reference frame DTMF signal 107, the frame counter is started, and the number of counts until the next reference frame signal is received is the total number of frames.

Therefore, it is possible to identify the total number of frames even when the number of frames is variable.

Some of the still picture information to be offered such as weather information, stock market information, traffic information, etc. may be better broadcast regardless of whether the user wants it or not.

If the relationship on the still picture information with the reference frame is kept at a constant level or if the still picture displayed on the sub-reference frame is the sub-menu picture, it is possible to select the still picture without using the menu.

In addition to a system where frame information is not inserted to any of the horizontal scanning line, the still picture, or the audio band, there is alternatively a system where the still picture frame information is inserted only in the audio band corresponding to some of the still pictures or a system where still picture frame information is inserted to the audio band corresponding to all of the still pictures. However, the operation in these latter systems is not basically different from the operation in the system of Embodiments 5 or 6, and detailed description is not given here.

In the above, description has been given on the cases where the system of the present invention is applied in still picture television broadcasting, whereas it is needless to say that the present invention is also applicable to a video tape or a video disk where still pictures are recorded.

INDUSTRIAL APPLICABILITY

The present system is an interactive information service system using a telephone and a television set widely propagated for home use, and the burden of cost on general users is low.

Pictures different for each frame of a television picture signal are transmitted, and this makes it possible to broadcast a great number of still pictures within a short time. For this reason, it is possible to provide interactive still picture services to each of many users.

Also, it is possible to display the contents of communication performed between the user and the information service provider on the display unit without increasing the burden on the information service provider.

I claim:

1. A method of transmitting a plurality of still pictures by a time-division still picture broadcast system, including the steps of determining a still picture to serve as a reference still picture, and selecting a still picture which has a relationship with said reference still picture, and appending still picture information to said transmitted still pictures for display at a receiver end.

2. A method according to claim 1, wherein said still pictures are transmitted in a unit of frames.

3. A method according to claim 1, wherein said still pictures are transmitted in a unit of fields.

4. A method according to claim 1, wherein said reference still picture is transmitted periodically.

5. A method according to claim 1, wherein said still pictures are repeatedly transmitted.

6. A method according to claim 1, wherein a plurality of groups of still picture programs comprising said reference still picture and said still picture having said relationship with said reference still picture are transmitted in series and also said plurality of groups of still picture programs are repeatedly transmitted.

7. A method according to claim 1, wherein still picture information is appended to said transmitted still pictures for display at a receiver end.

8. A method according to claim 1, wherein the order of said still pictures is displayed as said still picture information.

9. A method according to claim 1, wherein the order of said still pictures and the total number of still pictures repeatedly transmitted are displayed as said still picture information.

10. A method according to claim 1, wherein said still picture information is displayed only on a specific still picture among the transmitted still pictures.

11. A method according to claim 1, wherein said still picture information is inserted in an audio band, which is transmitted together with said still pictures.

12. A method according to claim 11, wherein said still picture information is inserted in an audio band corresponding to all still pictures.

13. A method according to claim 11, wherein said still picture information is inserted in an audio band corresponding only to a specific still picture.

14. A method according to claim 1, wherein said still picture information is transmitted by means other than a radio wave, by which said still pictures are transmitted.

15. A method according to claim 14, wherein said still picture information is transmitted via a communication line.

16. A method according to claim 15, wherein said still picture information is transmitted via the same communication line as said still pictures.

17. A method according to claim 5, wherein a menu of still pictures which have said relationship with said reference still picture is displayed.

18. A method of transmitting a plurality of still pictures by a time-division still picture broadcast system, including the steps of determining a still picture to serve as a reference still picture, selecting a still picture which has a relationship with said reference still picture, and displaying the order of said still pictures and the total number of still pictures repeatedly transmitted as still picture information.

19. A method of transmitting a plurality of still pictures by a time-division still picture broadcast system, including the steps of determining a still picture to serve as a reference still picture, selecting a still picture which has a relationship with said reference still picture, and appending still picture information to said transmitted still pictures, said still picture information being displayed at a receiver end only on a specific still picture among the transmitted still pictures.

20. A method of transmitting a plurality of still pictures by a time-division still picture broadcast system, including the steps of determining a still picture to serve as a reference still picture, selecting a still picture which has a relationship with said reference still picture, repeatedly transmitting said reference still picture, a further reference still picture which is selected according to its relationship with said reference still picture, and a still picture having said relationship with said further reference still picture, and displaying a menu of said still pictures which are selectable according to their relationship with said further reference still picture.

* * * * *